（12）United States Patent
Britsch et al.

(10) Patent No.: US 11,866,024 B2
(45) Date of Patent: Jan. 9, 2024

(54) VEHICLE BRAKE SYSTEM AND AGRICULTURAL TRACTOR

(71) Applicant: DEERE & COMPANY, Moline, IL (US)

(72) Inventors: Sebastian Britsch, Wurmberg (DE); Michaela Schnell, Speyer (DE)

(73) Assignee: DEERE & COMPANY, Moline, IL (US)

( * ) Notice: Subject to any disclaimer, the term of this patent is extended or adjusted under 35 U.S.C. 154(b) by 63 days.

(21) Appl. No.: 17/304,254

(22) Filed: Jun. 17, 2021

(65) Prior Publication Data
US 2022/0024431 A1 Jan. 27, 2022

(30) Foreign Application Priority Data

Jul. 27, 2020 (DE) .......................... 102020119750.0

(51) Int. Cl.
*B60T 8/48* (2006.01)
*B60T 8/40* (2006.01)
*B60T 13/14* (2006.01)

(52) U.S. Cl.
CPC .......... *B60T 8/4863* (2013.01); *B60T 8/4031* (2013.01); *B60T 8/4059* (2013.01); *B60T 13/142* (2013.01); *B60T 13/148* (2013.01)

(58) Field of Classification Search
CPC . B60T 8/38; B60T 8/48; B60T 8/4863; B60T 8/4031; B60T 8/146; B60T 11/21; B60T 8/4059

(Continued)

(56) References Cited

U.S. PATENT DOCUMENTS 3,386,775 A * 6/1968 Jones ...................... B60T 11/10
303/2
3,863,991 A * 2/1975 Wilson ................... B60T 11/18
60/581

(Continued)

FOREIGN PATENT DOCUMENTS

DE 3034628 A1 4/1982
DE 102013201440 A1 7/2014

(Continued)

OTHER PUBLICATIONS

Translation JP H-0656010 A. (Year: 1994).*

(Continued)

*Primary Examiner* — Thomas J Williams
(74) *Attorney, Agent, or Firm* — Taft Stettinius & Hollister LLP; Stephen F. Rost

(57) ABSTRACT

A vehicle brake system includes a first main cylinder with a first main cylinder connection and a first actuating device with a first actuating connection. The first main cylinder connection is in flow-connection to the first actuating connection, and the first actuating device is operable with the first main cylinder. A first brake circuit is provided between a pump and a first wheel cylinder, where the pump in the first brake circuit is operable to generate pressure and move a fluid within the first brake circuit. A first valve device is provided in the first brake circuit where the first valve device is movable between a first configuration in which a flow connection is produced between the pump and the first wheel cylinder, and a second configuration in which a flow connection between the pump and the first wheel cylinder is prevented.

20 Claims, 9 Drawing Sheets

(58) Field of Classification Search
USPC ........................................................ 303/117.1
See application file for complete search history.

(56) References Cited

U.S. PATENT DOCUMENTS

| | | | | |
|---|---|---|---|---|
| 5,221,126 | A * | 6/1993 | Inoue .................... | B60T 8/3665 |
| | | | | 303/13 |
| 5,372,412 | A * | 12/1994 | Yagi ...................... | B60T 8/4827 |
| | | | | 303/162 |
| 10,793,126 | B2 * | 10/2020 | Hill .......................... | B60T 8/26 |
| 2019/0118788 | A1 * | 4/2019 | Bruett ................... | B60T 11/108 |
| 2019/0184952 | A1 * | 6/2019 | Hill ....................... | B60T 13/686 |
| 2022/0024431 | A1 * | 1/2022 | Britsch ................. | B60T 8/4031 |

FOREIGN PATENT DOCUMENTS

| | | | | | |
|---|---|---|---|---|---|
| DE | 102018111451 | A1 | | 11/2019 | |
| GB | 2463648 | A | * | 3/2010 | ............. B60T 8/243 |
| JP | H-0656010 | A | * | 3/1994 | ................ B60T 8/00 |
| JP | 08282458 | A | * | 10/1996 | |
| JP | 10297459 | A | * | 11/1998 | ............ B60T 8/4072 |
| WO | WO9615015 | A1 | | 5/1996 | |
| WO | WO03082645 | A1 | | 10/2003 | |
| WO | WO2014099747 | A1 | | 6/2014 | |

OTHER PUBLICATIONS

Extended European Search Report and Written Opinion issued in European Patent Application No. 21187706.3, dated Nov. 9, 2021, 8 pages.

* cited by examiner

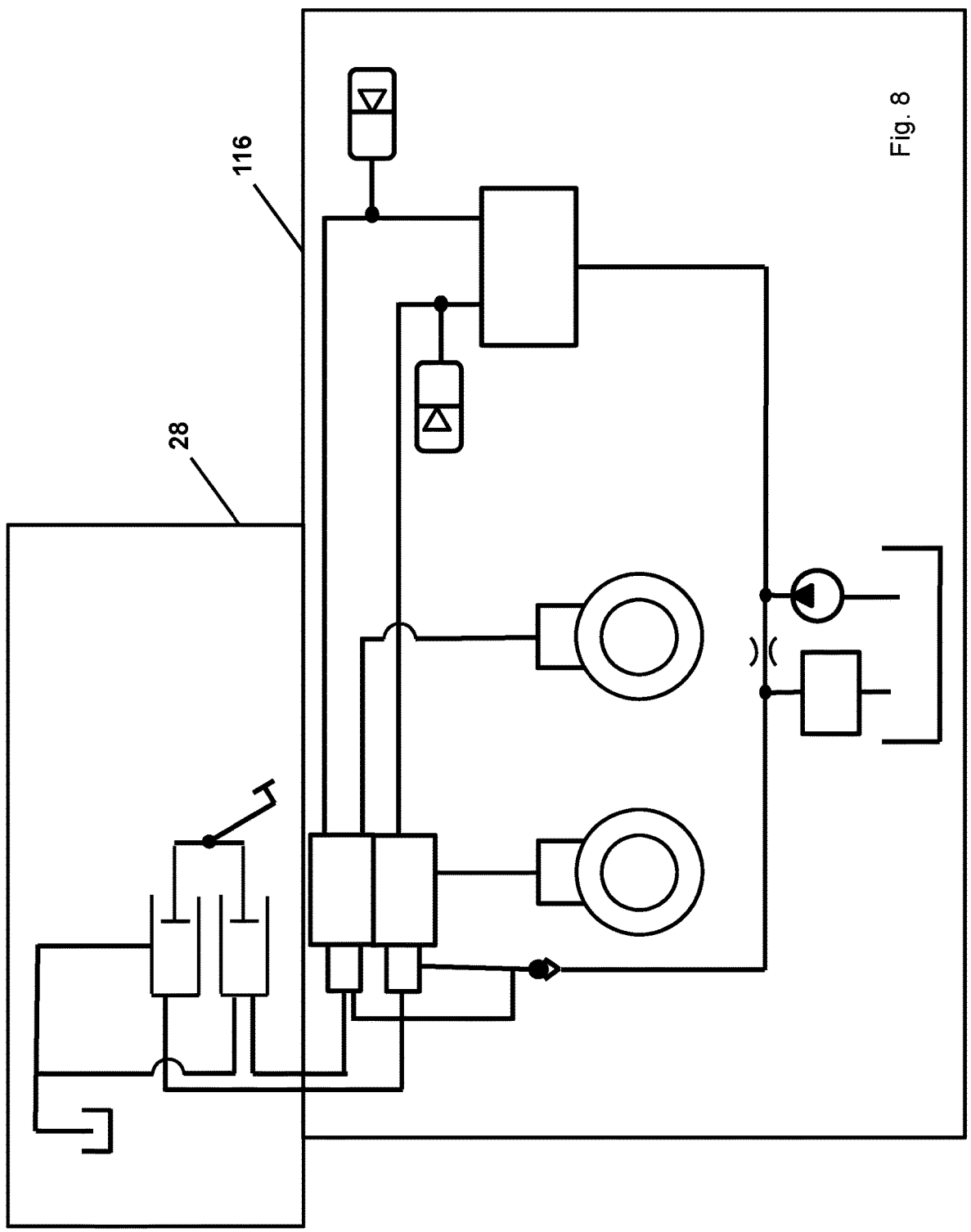

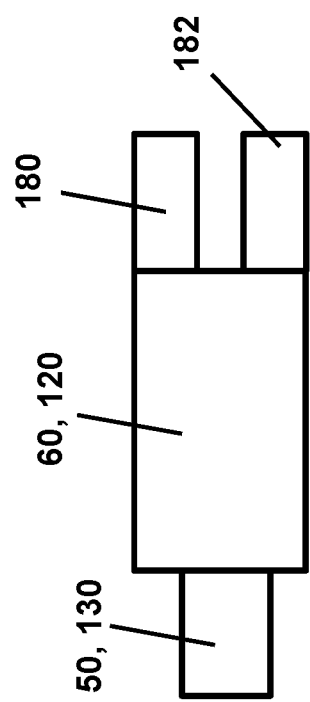

VEHICLE BRAKE SYSTEM AND AGRICULTURAL TRACTOR

RELATED APPLICATIONS

This application claims priority to German Patent Application No. 102020119750.0, filed Jul. 27, 2020, the disclosure of which is hereby expressly incorporated by reference in its entirety.

FIELD OF THE DISCLOSURE

The present disclosure relates to a vehicle brake system and an agricultural tractor.

BACKGROUND

Conventional vehicle brake systems in agricultural tractors comprise valve arrangements for braking, in particular with a first or second valve device or valves which are arranged in particular in a cabin of the tractor. As a result of this arrangement of valve arrangements, the vehicle brake system has a complex guidance of the lines and connections, i.e., the hydraulic supply and the wheel cylinders for braking a wheel can be arranged on a chassis and a majority of the valve arrangement in the cabin. Disadvantages of the known valve arrangement are thus that these require a large installation space in the cabin, in particular at the brake pedal, and transmit extraneous hydraulic noise into the cabin. The problem on which the present disclosure is based thus lies in providing a vehicle brake system and an agricultural tractor which optimize known vehicle brake systems and agricultural tractors.

Proceeding from the prior art, there is a need for a vehicle brake system and an agricultural tractor which largely avoids the disadvantages known from the prior art, in particular a vehicle brake system and an agricultural tractor which are configured to be structurally simpler, for example, are temperature-independent or maintenance-free, or require less installation space or reduce or avoid extraneous noise.

SUMMARY

According to the present disclosure, a vehicle brake system is proposed. The vehicle brake system comprises a first main cylinder with a first main cylinder connection and a first actuating device with a first actuating connection. The first main cylinder connection is in flow-connection to the first actuating connection, these are therefore in particular flow-connected, and the first actuating device can be operated with the first main cylinder, is settable in such a manner or adjustable. The vehicle brake system further comprises a first brake circuit, in particular a hydraulic brake circuit, which is provided between a pump and a first wheel cylinder, in particular a first hydraulic wheel cylinder. The pump is capable of being operated in the first brake circuit to generate pressure and move a fluid, in particular hydraulic fluid or hydraulic oil, within the first brake circuit. Moreover, a first valve device is provided in the first brake circuit. The first valve device is movable between a first configuration, i.e., in particular a first shifting position, in which a flow connection is produced between the pump and the first wheel cylinder, in particular by the first valve device, and a second configuration, in particular a second shifting position, in which a flow connection between the pump and the first wheel cylinder is prevented by the first valve device. Moreover, the first valve device, in particular if the first actuating device is actuated with the first main cylinder, can be operated with the first actuating device or can be operated in such a manner that the first valve device can be or is moved into the first configuration.

In other words, the first valve device can be operated in order, in a first configuration, to produce a flow connection between the pump and the first wheel cylinder and, in a second configuration, to prevent a flow connection between the pump and the first wheel cylinder. In this case, the first valve device, i.e., if the first actuating device is actuated with the first main cylinder, can be operated with the first actuating device or operated in such a manner that the first valve device can be moved or is moved into the first configuration, in particular from the second configuration into the first configuration.

The first main cylinder connection and the first actuating connection can be respectively inlet and outlet for the fluid. Moreover, the first main cylinder connection is connected, for example, by a first actuating line, to the first actuating connection. The first main cylinder is therefore in flow-connection to the first actuating device or the first main cylinder is flow-connected to the first actuating device. The first main cylinder can comprise a first main cylinder chamber and a first main cylinder piston arranged in the first main cylinder chamber. The first main cylinder connection can be an inlet and outlet of the first main cylinder chamber of the first main cylinder. The first main cylinder piston can be moved into a retracted and extended position in relation to the first main cylinder chamber in the first main cylinder chamber as a result of being acted upon with pressure. The first main cylinder or first main cylinder piston can be actuated by an actuable brake pedal which can be arranged in the cabin of an agricultural tractor. The first main cylinder can therefore be actuated by the brake pedal which can be actuated by a user.

The vehicle brake system has a first brake circuit. The first wheel cylinder can be configured such that one or more front or rear wheels can be braked or is/are braked with the first wheel cylinder. The first brake circuit or the first wheel cylinder can be coupled to the one or more rear wheels or to the one or more front wheels. The first brake circuit or the first wheel cylinder is configured as a reaction to an actuation of the brake pedal, to brake one or more front or rear wheels or driven wheels. The first wheel cylinder of one or more front or rear wheels can brake as a reaction to an actuation of the brake pedal.

The first brake circuit can be provided physically in a hydraulic assembly. The vehicle brake system can comprise the hydraulic assembly. The hydraulic assembly can be configured so that it provides brake force distribution or drive control as part of a general electronic stability program (ESP) of the tractor since already many of the same equipment components can be provided by the vehicle brake system. The vehicle brake system can have an anti-locking brake functionality in order to prevent locking of the wheels and skidding in the case of sharp braking or braking on low-friction surfaces. Although the hydraulic assembly can be used in vehicle brake systems with anti-locking or other functions, its use is not restricted to such systems.

The first valve device can comprise a first brake valve or a first brake valve which can be arranged only in the first brake circuit in some embodiments or in the first and a second brake circuit in other embodiments. The first valve device or the first brake valve can as standard assume the second configuration. The first valve device or valve or a second valve device or valve can be embodied, for example, as an actuable 4/2 or 5/2 or 4/3 or 5/3 way valve with four or five connections. The first valve device can comprise at least the first and second configuration, wherein the first configuration is a through-flow position and the second configuration is a locking position.

The first actuating device can be formed to exert a shifting force S on the first valve device. The first actuating device can actuate the first valve device with pressure. The first actuating device can comprise, for example, a first pressure valve or piston, with the first actuating connection, wherein, if the first actuating connection is acted upon by the first main cylinder with a force or pressure, the first pressure valve moves the first valve device into the first configuration, i.e., the first valve device can be moved or is moved with the first pressure valve from the second configuration into the first configuration. The first actuating device and the first valve device can be configured in such a manner and be capable of being operated that if the first actuating device is actuated with the first main cylinder, the first actuating device actuates the first valve device with shifting force S so that the first valve device can be moved or is moved into the first configuration. The first actuating device can also be formed as an integral component of the first valve device or valve. The first actuating device can be formed as an actuator or, however, also as a pilot control valve (e.g., an electro-magnetically controlled two-position valve which is open in the idle state) or as a first auxiliary cylinder. The first auxiliary cylinder can comprise a first auxiliary cylinder chamber and a first auxiliary cylinder piston arranged in the first auxiliary cylinder chamber. In this case, the first actuating connection can be an inlet and outlet of the first auxiliary cylinder chamber of the first auxiliary cylinder. The first auxiliary cylinder piston can, in the first auxiliary cylinder chamber, be capable of being moved by the action of pressure into a retracted and extended position in relation to the first auxiliary cylinder chamber. The first auxiliary cylinder, in particular the first auxiliary cylinder piston, can, if the first actuating connection is acted upon with pressure by the first main cylinder, move the first valve device into the first configuration, in particular move the first valve device from the second configuration into the first configuration.

The pump can be in flow-connection by a line to an accumulator charging device or an accumulator charging valve. The pump can also be formed as a first and second pump. The first brake circuit can connect the accumulator charging device to the first valve device by a first brake line. Moreover, the first brake circuit can connect the first valve device to the first wheel cylinder, for example, by a further first brake line. A first accumulator, e.g., a first container can be arranged between the accumulator charging device and the first valve device at or in the first brake line. The first pressure accumulator can comprise a bladder. The first accumulator or first container can be in flow-connection to the first brake line or be arranged downstream in the direction of flow from the accumulator charging device. The pump can furthermore be in flow-connection or be flow-connected to a fluid container or be arranged downstream in the direction of flow from the fluid container. The pump can be a pressure source, in particular a hydraulic pump. The first brake circuit can therefore be formed by the pump up to the first wheel cylinder. Moreover, the first brake circuit can comprise the first brake line, the further first brake line, the first valve device, the first wheel cylinder and the first actuating device.

The first valve device is actuated with the first main cylinder and can be operated with the first actuating device such that the first valve device can be moved or is moved into the first configuration. As a result of this, a vehicle brake system with a closed main-auxiliary system, here the first main cylinder and first actuating device, wherein the first or second main cylinder can advantageously be embodied to be significantly smaller and in particular connected directly to the brake pedal.

A further advantage is that the vehicle brake system has no restrictions in terms of modulation characteristics and the response time at low ambient temperature. The present disclosure thus advantageously enables a highly dynamic or temperature-independent or maintenance-free vehicle brake system, in particular with minimal installation space around the brake pedal or reduced line guidance outlay to the cabin (smaller number of lines and smaller cross-section) or noise reduction. Moreover, the vehicle brake system can be operated independently of the steering return movement and is in particular not connected to the steering return movement. Moreover, a small continuous fluid flow or fluid pressure can advantageously be realized by the vehicle brake system as a result of which a monitoring of the fluid can be dispensed with.

In one configuration of the present disclosure, the vehicle brake system comprises a second brake circuit which is arranged between the pump and a second wheel cylinder. The pump can be operated in the second brake circuit in order to generate pressure and move the fluid within the second brake circuit. The second brake cylinder can be configured such that one or more front or rear wheels can be braked or is/are braked with the second wheel cylinder. The second brake circuit, or the second wheel cylinder, can be coupled to the one or more rear wheels or to the one or more front wheels. The second brake circuit, or the second wheel cylinder, is configured to brake one or more front or rear wheels as a reaction to an actuation of the brake pedal. The second wheel cylinder can brake one or more front or rear wheels as a reaction to an actuation of the brake pedal. In particular, the first brake circuit, or the first wheel cylinder, can be coupled to the rear wheels and the second brake circuit can be coupled to the rear wheels. However, the first brake circuit can likewise also be coupled to one or more rear or front wheels and the second brake circuit can be coupled to one or more further rear or further front wheels.

The first and second brake circuits can be divided into circuits for one or more rear wheels or front wheels. The first or second brake circuit can be provided physically in the hydraulic assembly. The second brake circuit, or the second wheel cylinder, can be configured to brake a front or rear wheel as a reaction to an actuation of the brake pedal. The second wheel cylinder can therefore brake the front or rear wheel as a reaction to an actuation of the brake pedal. If the pump is formed as a first and second pump, the first brake circuit can be formed between the first pump and the first wheel cylinder, and the second brake circuit can be formed between the second pump and the second wheel cylinder. The first pump can thus be operable in the first brake circuit in order to generate pressure and move fluid, e.g., hydraulic fluid, within the first brake circuit, and the second pump can be operable in the second brake circuit in order to generate pressure and move fluid within the second brake circuit. A first and second brake circuit advantageously enable different deceleration or a redundant vehicle brake system.

In one configuration of the present disclosure, the first valve device, or the first brake valve, is provided in the first and second brake circuit. The first valve device is movable between a first configuration, in which a flow connection is produced between the pump and the first and second wheel cylinder, and a second configuration, in which a flow connection between the pump and the first and second wheel cylinder is prevented by the first valve device. The first valve device, if the first actuating device is actuated with the first main cylinder, can be operated with the first actuating device or operated in such a manner that the first valve device can be moved or is moved into the first configuration. The first valve device can, however, also be arranged only in the first brake circuit, according to some embodiments. The first and second brake circuit can thus advantageously and easily be operated with only the first valve device, according to some embodiments.

In one configuration of the present disclosure, a second valve device is provided in the second brake circuit. In this case, the second valve device can be arranged in particular between the pump and the second wheel cylinder and the pump. The second valve device arranged in the second brake circuit is movable between a third configuration, in which a flow connection is produced between the pump and the second wheel cylinder, and a fourth configuration, in which a flow connection between the pump and the second wheel cylinder is prevented by the second valve device. The second valve device can comprise a second brake valve arranged in the second brake circuit. The second valve device can as standard assume the fourth configuration. The second valve device can be embodied, for example, as an actuable 4/2 or 5/2 or 4/3 or 5/3 way valve with four or five connections. The second valve device can comprise at least the third and fourth configuration (shifting position), wherein the third configuration is a through-flow position and the fourth configuration is a locking position.

The second valve device can be configured just like the first valve device. The second brake circuit can, for example, via a second brake line connect the accumulator charging device to the second valve device or brake valve. Moreover, the second brake circuit can, in particular by a further second brake line, connect the second valve device to the second wheel cylinder. A second accumulator can be arranged between the accumulator charging device and the second valve device at or in the second brake line. The second pressure accumulator can comprise a bladder. The second accumulator or second container can be in flow-connection or be flow-connected to the second brake line or arranged downstream in the direction of flow from the accumulator charging device. Moreover, the second brake circuit can comprise the second brake line, the further second brake line, the second valve device, the second wheel cylinder and the second actuating device. As a result of this, a first and second brake circuit can advantageously be formed in a structurally simple manner. The vehicle brake system can furthermore be operated redundantly.

In one configuration of the present disclosure, the first and second valve device, if the first actuating device is actuated with the first main cylinder, can be operated with the first actuating device or can be operated in such a manner that the first valve device can be moved or is moved into the first configuration and the second valve device can be moved or is moved into the third configuration, in particular can be moved or is moved from the fourth configuration into the third configuration. In this case, for example, the first actuating device can be formed to exert a shifting force S on the first and second valve device. The first actuating device and the first and second valve device can be configured in such a manner and operable that the first actuating device actuates the first and second valve device with shifting force S so that the first valve device can be moved or is moved into the first configuration and the second valve device can be moved or is moved into the third configuration. The first actuating device can also be formed as an integral component of the first and second valve device. The first actuating device can actuate the first and second valve device with pressure. If the first actuating connection is acted upon with pressure by the first main cylinder, the first pressure valve moves the first valve device into the first configuration and the second valve device into the third configuration. In particular, the first auxiliary cylinder, if the first actuating connection is acted upon with pressure by the first main cylinder, moves the first valve device into the first configuration and the second valve device into the third configuration. As a result of this, a first and second brake circuit can advantageously be operated in a simple manner. Moreover, as a result of this, the vehicle brake system can be configured to be structurally simpler and requires less installation space in the tractor. Moreover, extraneous noise is reduced or avoided.

In one configuration of the present disclosure, the vehicle brake system comprises a second actuating device with a second actuating connection, wherein the first main cylinder connection is in flow-connection to the second actuating connection. The second actuating device can be operated with the first main cylinder. The first valve device can be operated with the first actuating device and the second valve device can be operated with the second actuating device or operated in such a manner that if the first and second actuating device are actuated with the first main cylinder, the first valve device can be moved or is moved into the first configuration and the second valve device can be moved or is moved into the third configuration. The second actuating device can be formed to exert a shifting force S on the second valve device. The second actuating device can actuate the second valve device with pressure. The second actuating device can comprise, for example, a second pressure valve or a piston with the second actuating connection. If the second actuating connection is acted upon with pressure by the first main cylinder, the second pressure valve moves the second valve device into the third configuration, in particular the second valve device can be moved or is moved with the second pressure valve from the fourth configuration into the third configuration.

The second actuating device and the second valve device can be configured in such a manner and operable that if the second actuating device is actuated with the first main cylinder, the second actuating device actuates the second valve device with shifting force S so that the second valve device can be moved or is moved into the third configuration. The second actuating device can also be formed as an integral component of the second valve device. The second actuating device can, however, also be formed as a pilot control valve (e.g., an electromagnetically controlled two-position lever which is open in the idle state), or a second auxiliary cylinder. The second auxiliary cylinder can comprise a second auxiliary cylinder chamber and a second auxiliary cylinder piston arranged in the second auxiliary cylinder chamber. In this case, the second actuating connection can be an inlet and outlet of the second auxiliary cylinder chamber of the second auxiliary cylinder.

The second auxiliary cylinder piston can be moved in the second auxiliary cylinder chamber by being acted upon with pressure into a retracted and extended position in relation to the second auxiliary cylinder chamber. The second auxiliary cylinder, in particular the second auxiliary cylinder piston, can, if the second actuating connection is acted upon with pressure by the first main cylinder, move the second valve device into the third configuration, i.e., from the fourth configuration into the third configuration. The first main cylinder can, however, also have a further first main cylinder connection. The further first main cylinder connection and the second actuating connection can be in each case an inlet and outlet for the flowing fluid. The further first main cylinder connection can therefore, instead of the first main cylinder connection, be connected by the second actuating line to the second actuating connection. The first main cylinder can therefore be in flow-connection to the second actuating device or the first main cylinder can be flow-connected to the second actuating device. In this exemplary embodiment, the first main cylinder connection can be connected to the first actuating connection and the further first main cylinder connection can be connected to the second actuating connection. As a result of this, the first and second brake circuit can be operated in a simple manner redundantly. Moreover, as a result of this, the vehicle brake system can be configured to be structurally simpler.

In one configuration of the present disclosure, the vehicle brake system comprises a second main cylinder with a second main cylinder connection and the second actuating device with a second actuating connection, wherein the second main cylinder connection is in flow-connection to the second actuating connection and the second actuating device can be operated with the second main cylinder. The first valve device, if the first actuating device is actuated with the first main cylinder, can be operated with the first actuating device or can be operated in such a manner that the first valve device can be moved into the first configuration, or the second valve device, if the second actuating device is actuated with the second main cylinder, can be operated with the second actuating device in such a manner that the second valve device is moved into the third configuration. In other words, the second valve device can be operated with the second actuating device, so that the second valve device can be moved or is moved into the third configuration, i.e., from the fourth configuration into the third configuration.

The second actuating device and the second valve device can be configured in such a manner and operable that the second actuating device actuates the second valve device with shifting force S so that the second valve device can be moved or is moved into the third configuration. The second main cylinder connection can be in each case an inlet and outlet for the fluid. The second main cylinder can therefore be in flow-connection to the second actuating device or the second main cylinder can be flow-connected to the second actuating device, for example, by a second actuating line. The second actuating device or valve can, if the second actuating connection is acted upon with a force or pressure by the second main cylinder, move the second valve device into the third configuration. If the second actuating device is formed as a second auxiliary cylinder, the second auxiliary cylinder can, if the second actuating connection is acted upon with pressure by the second main cylinder, move the second valve device into the third configuration.

The second main cylinder can comprise a second main cylinder chamber and a second main cylinder piston arranged in the second main cylinder chamber. In this case, the second main cylinder connection can be an inlet and outlet of the second main cylinder chamber. The second main cylinder piston can, in the second main cylinder chamber, be moved by being acted upon with pressure into a retracted and extended position in relation to the second main cylinder chamber. The first and second main cylinder can be actuated by the brake pedal which can be actuated by a user. The first and second brake circuit are therefore configured, as a reaction to an actuation of the brake pedal, to brake in each case one or more front or rear wheels. It can, however, also be the case that the first main cylinder is actuated with the brake pedal and the second main cylinder or the second main cylinder piston is actuated with a further brake pedal by a user. The second brake circuit can therefore be configured as a reaction to an actuation of the further brake pedal to brake one or more front or rear wheels. As a result of this, all of the above-mentioned advantages of the vehicle brake system according to the present disclosure can be realized.

In one configuration of the present disclosure, the first actuating device has a first supply connection or the second actuating device has a second supply connection. Moreover, the first or second supply connection can be flow-connected by a first supply line to the pump, i.e., either only the first supply connection is flow-connected by the first supply line to the pump according to some embodiments or the first and second supply connection are simultaneously flow-connected by the first supply line to the pump in other embodiments. The first supply connection can, however, likewise be flow-connected by a first supply line to the pump or the second supply connection can be flow-connected by a second supply line to the pump. The first and second supply connection can be an inlet and outlet for the fluid. In particular, the first supply connection can be an inlet and outlet of the first auxiliary cylinder chamber of the first auxiliary chamber or the second supply connection can be an inlet and outlet of the second auxiliary cylinder chamber of the second auxiliary chamber. The pump can be connected by the first or second supply line to the first or second actuating device, i.e., be in flow-connection or flow-connected to the first or second actuating device. There can be arranged in the first supply line a first pressure relief valve or in the second supply line a second pressure relief valve, which pressure relief valve(s) open(s), should a pressure which exceeds a predefined maximum pressure arise in the respective supply line. In each case a check valve can likewise be arranged in the first or second supply line between the first or the second supply connection and the respective assigned pressure relief valve, in particular a first check valve can be arranged in the first supply line or a second check valve can be arranged in the second supply line. In order to reduce the pressure in the first or second supply line, a first throttle or a throttle valve can be arranged between the pump and the respective pressure relief valve in the first supply line or a second throttle or a throttle valve can be arranged in the second supply line. As a result of this, a small continuous fluid flow or fluid pressure of the fluid to the first or second actuating device can advantageously be realized. The size of a reservoir can furthermore advantageously be significantly reduced.

In one configuration of the present disclosure, the first main cylinder comprises a first reservoir connection or the second main cylinder comprises a second reservoir connection. Alternatively, the first main cylinder is flow-connected by the first reservoir connection or the second main cylinder is flow-connected by the second reservoir connection to a reservoir. The first or second reservoir connection can be an inlet and outlet for the fluid. The reservoir can serve as an outflow and for the supply for the first main cylinder or the second main cylinder. The first reservoir connection can be connected with the first reservoir line or the second reservoir connection can be connected with a second reservoir line to the reservoir. The first or second main cylinder can therefore be in flow-connection to the reservoir. The reservoir advantageously only has the connection to the first or second main cylinder, i.e., is an independent reservoir, according to some embodiments. Moreover, the reservoir is independent of the steering return movement and is not formed as a component of the steering return movement. As a result of this, a small continuous fluid flow or fluid pressure of the fluid from the first or second actuating element to the first or second main cylinder can advantageously be realized, as a result of which a monitoring of the reservoir and access to the reservoir for refilling can be dispensed with. Moreover, a closed reservoir, i.e., a link to existing reservoirs, for example, steering, can be dispensed with and the size of the reservoirs can be significantly reduced.

In one configuration of the present disclosure, the first or the second valve device have in each case a first restoring device for restoring into the second or fourth configuration. Moreover, the first or the second valve device can have in each case a second restoring element for restoring into the second or fourth configuration. The first or second restoring element at the first valve device can therefore move the first valve device from the first into the second configuration. The further first or the further second restoring element at the second valve device can likewise move the second valve device from the third into the fourth configuration. The first or second restoring element can be controlled e.g., mechanically or electromechanically or electromagnetically. The first or second restoring element can be formed, for example, as a spring or as an electric actuation with a magnetic coil. The second restoring element is advantageously an additional actuation for compensation of the flow or pressure of the fluid in the first or second valve device. The restoring of the first or second valve device can be controlled more precisely by the first and second restoring element. As a result of this, the fluid flow can also advantageously be interrupted in the case of gentle actuation of the brake pedal or the further brake pedal, wherein each further movement builds up pressure and actuates the first or second valve device.

The present disclosure furthermore relates to an agricultural tractor comprising a vehicle brake system. The agricultural tractor has the advantages described above of the vehicle brake system according to the present disclosure. In one configuration of the present disclosure, the agricultural tractor comprises a cabin and a chassis, wherein the cabin is arranged at or on the chassis. Moreover, the first or second main cylinder and the reservoir, as well as the associated lines, are arranged in the cabin. All of the other components of the vehicle brake system can be arranged at the chassis.

The vehicle brake system according to the present disclosure or the tractor can comprise a control unit. The control unit or further control unit (ECU=electronic control unit or ECM=electronic control module) can be an electronic module or an embedded system. The control unit can include a memory module or a processor. The control unit can be signal-connected, therefore connected in a data-conducting manner, to the first or second main cylinder, the first or second actuating device, the first or second valve device, one or more sensors or the memory or processor or the hydraulic assembly. The connection can be realized in a cabled or cable-free manner, i.e., wirelessly. The communication bus can be, for example, isobus, CAN-bus or the like. The control unit can be provided as part of the vehicle brake system or on the tractor. In particular, two control units can also be provided, a first for the tractor and a second for the vehicle brake system. Moreover, the first or second main cylinder or the first or second actuating device, in particular the auxiliary cylinder, or the first or second valve device or the one or more sensors can be capable of being adjusted or set by the control unit. The sensor(s) can supply input information, in general in relation to relative wheel rotational speeds, so that the control unit can regulate the operation of the hydraulic assembly.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein:

FIG. 8 shows a schematic representation of an arrangement of a vehicle brake system in a tractor, and FIG. 9 shows a schematic representation of another arrangement of a vehicle brake system in a tractor.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
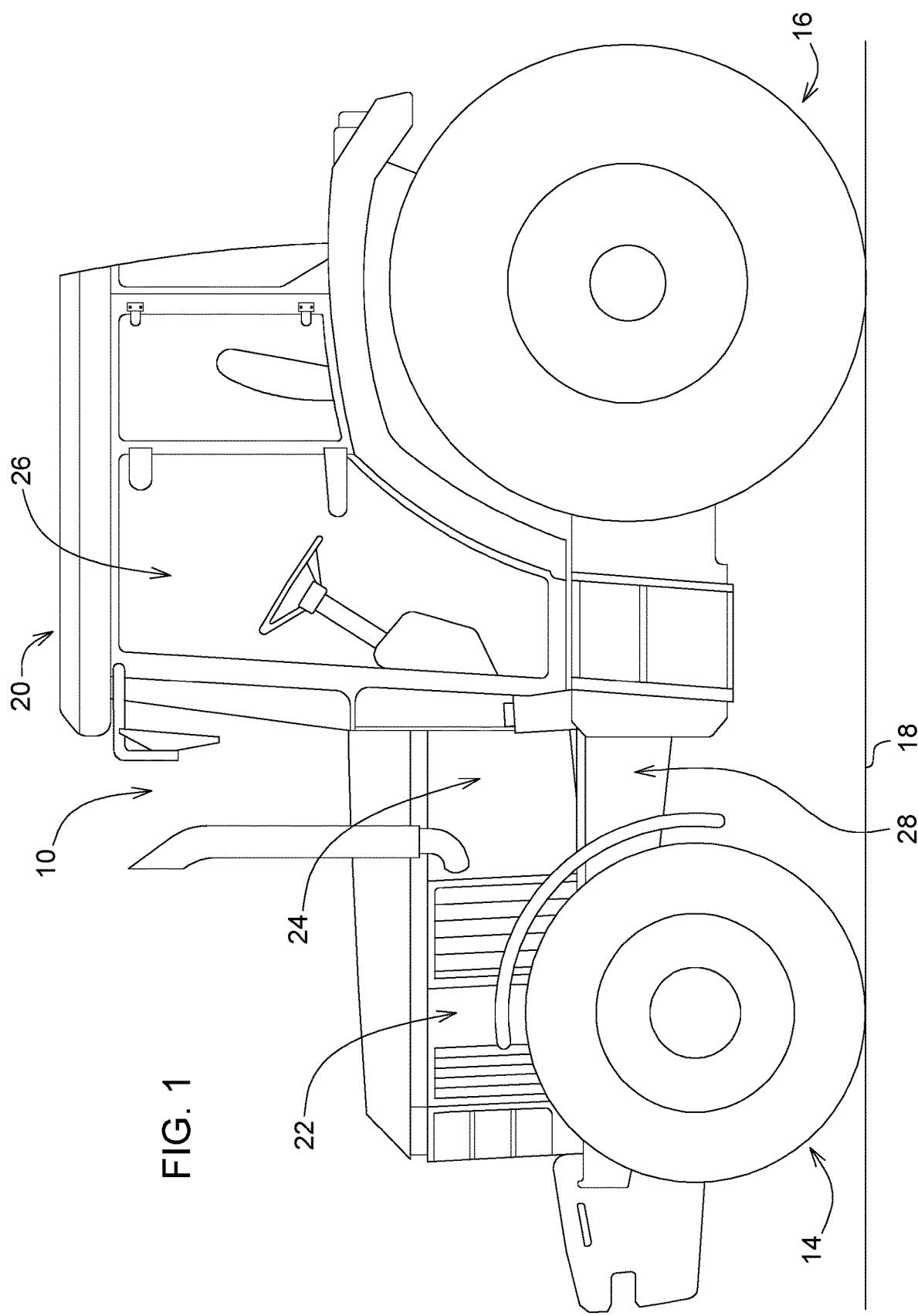
FIG. 1 shows a schematic representation of an agricultural tractor.

FIG. 1 shows a schematic side view of an agricultural tractor 10 according to the present disclosure, in particular in the form of a farm tractor or tractor. The fundamental structure of an agricultural tractor 10 is assumed to be known to the person skilled in the art.

Tractor 10 has two or more ground-engagement means or devices, in particular in the form of wheels 14, 16, which are in engagement with the ground for the transmission of drive forces or by which tractor 10 is supported on ground 18. The ground-engagement means or device can be arranged or suspended on a front axle or a rear axle. In particular, the ground-engagement devices are front wheels 14, which can be arranged on the front axle, or rear wheels 16, which can be arranged on the rear axle. Tractor 10 can furthermore have a chassis, wherein the chassis is supported in particular by the ground-engagement devices suspended on the front axle and the rear axle.

Tractor 10 furthermore has a drive 22, shown in outline, for example, a motor which can be formed in the form of an internal combustion engine. Moreover, tractor 10 can comprise a transmission device 24. The ground-engagement device can be driven with drive 22 which interacts with transmission device 24. In particular, an output torque of transmission device 24 can be transmitted via a drivetrain to the ground-engagement device. Tractor 10 has a cabin 20 in which an operator workstation 26 is arranged. Tractor 10 furthermore comprises a vehicle brake system 28 according to the present disclosure.

Figure 2:
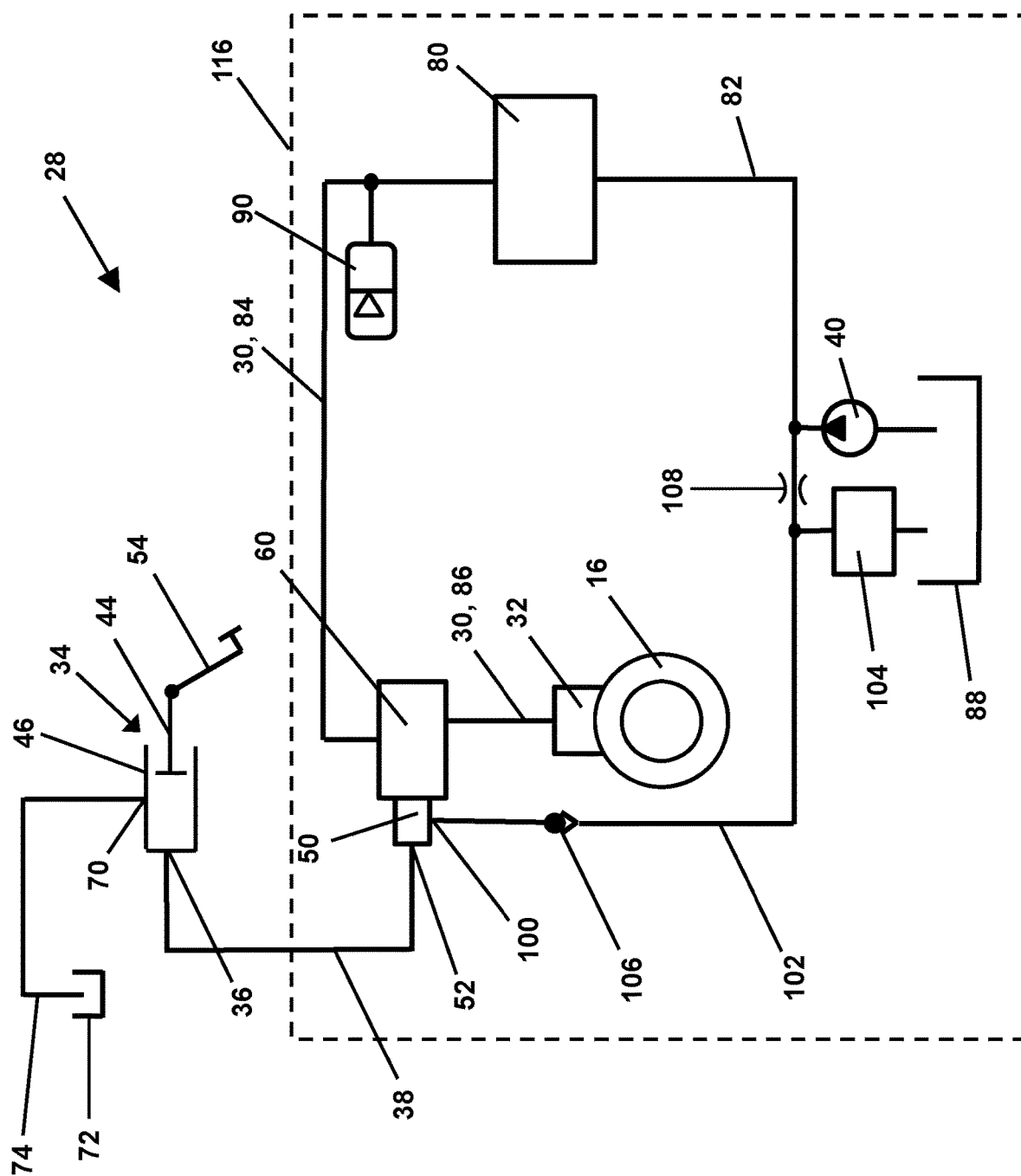
FIG. 2 shows a schematic representation of a first embodiment of the vehicle brake system.

FIG. 2 shows a schematic representation of a first embodiment of vehicle brake system 28 according to the present disclosure. Vehicle brake system 28 shown in FIG. 2 is a detailed schematic representation of vehicle brake system 28 shown in FIG. 1. Details which are not shown in FIG. 1 are therefore discussed below. Vehicle brake system 28 can, as represented in FIG. 1, be installed in an agricultural tractor 10.

Vehicle brake system 28 has a first brake circuit 30, in particular a first hydraulic brake circuit. First brake circuit 30 is provided between a pump 40 and a first wheel cylinder 32. Pump 40 can be operated in first brake circuit 30 in order to generate pressure and move a fluid within first brake circuit 30. First wheel cylinder 32 can be configured in such a manner that one or more front or rear wheels 14, 16 can be braked or is/are braked with first wheel cylinder 32. In FIG. 2, first brake circuit 30 is coupled to the one or more rear wheels 16, in particular by first wheel cylinder 32. First brake circuit 30 can, however, also be coupled only to one or more front wheels 14, according to some embodiments.

As shown in FIG. 2, vehicle brake system 28 comprises a first main cylinder 34 with a first main cylinder connection 36 and a first actuating device 50 with a first actuating connection 52. First main cylinder connection 36 and first actuating connection 52 are in each case an inlet and outlet for the flowing fluid. Vehicle brake system 28 comprises a first actuating line 38 which connects first main cylinder connection 36 and first actuating connection 52. First main cylinder 34 is therefore in flow-connection to first actuating device 50. Moreover, first actuating device 50 can be operated with first main cylinder 34 or is operated with it. In this case, first main cylinder 34 can exert a force on first actuating device 50, for example, in that first main cylinder 34 is actuated with a brake pedal 54, i.e., a flow or a pressure of the fluid is exerted from first main cylinder 34 to first actuating device 50.

A first valve device 60 is furthermore arranged in first brake circuit 30. First valve device 60 is movable between a first configuration, in which a flow connection between pump 40 and first wheel cylinder 32 is produced by first valve device 60, and a second configuration, in which a flow connection between pump 40 and first wheel cylinder 32 is prevented by first valve device 60. Moreover, the first valve device 60, if first actuating device 50 is actuated with first main cylinder 34, can be operated with first actuating device 50 or can be operated in such a manner that first valve device 60 can be moved or is moved into the first configuration.

In other words, first valve device 60 can be operated in a first configuration to produce a flow connection between pump 40 and first wheel cylinder 32 and, in a second configuration, to prevent a flow connection between pump 40 and first wheel cylinder 32. In this case, first valve device 60, in particular if first actuating device 50 is actuated with first main cylinder 34, can be operated with first actuating device 50 or can be operated in such a manner that first valve device 60 can be moved or is moved into the first configuration, i.e., from the second configuration into the first configuration.

For example, first actuating device 50 can be formed to exert a shifting force S on first valve device 60. First actuating device 50 and first valve device 60 can be configured in such a manner and operable that if first actuating device 50 is actuated with first main cylinder 34, first actuating device 50 actuates first valve device 60 with shifting force S so that first valve device 60 can be moved or is moved into the first configuration. First valve device 60 can comprise a first brake valve which can be arranged in first brake circuit 30.

First main cylinder 34 comprises a first main cylinder chamber 46 and a first main cylinder piston 44 arranged in first main cylinder chamber 46. First main cylinder connection 36 can be an inlet and outlet of first main cylinder chamber 46 of first main cylinder 34. First main cylinder piston 44 can be moved in first main cylinder chamber 46 by being acted upon with pressure into a retracted and extended position in relation to first main cylinder chamber 46. First main cylinder 34 can be actuated by brake pedal 54 by a user. First brake circuit 30 is therefore configured, as a reaction to an actuation of brake pedal 54, to brake a front or rear wheel 14, 16. As a reaction to an actuation of brake pedal 54, first wheel cylinder 32 can brake front or rear wheel 14, 16.

First main cylinder 34 comprises a first reservoir connection 70. First reservoir connection 70 is an inlet and outlet for the fluid. A reservoir 72 is furthermore provided. Reservoir 72 can be provided as an outflow and emergency supply for first main cylinder 34 or a second main cylinder (see FIGS. 6 and 7, reference number 140). First reservoir connection 70 is connected with a first reservoir line 74 to reservoir 72. First main cylinder 34 is therefore in flow-connection to reservoir 72. Reservoir 72 has only the connection to first or second main cylinder 34, 140, and is therefore an independent reservoir, according to some embodiments. Moreover, reservoir 72 is independent of the steering return movement and is not formed as a component of the steering return movement.

Pump 40 is connected by a line 82 to an accumulator charging device 80. A first brake line 84 of first brake circuit 30 connects accumulator charging device 80 to first valve device 60. A further first brake line 86 of first brake circuit 30 connects first valve device 60 to first wheel cylinder 32. A first accumulator 90 is arranged between accumulator charging device 80 and first valve device 60 at or in first brake line 84. First accumulator 90 is in flow-connection to first brake line 84 or arranged downstream of accumulator charging device 80 in the direction of flow. Pump 40 is furthermore in flow-connection to a fluid container 88 or arranged downstream of fluid container 88 in the direction of flow.

First actuating device 50 can actuate first valve device 60 with pressure. First actuating device 50 can, for example, as described above, be formed as a first pressure valve, as a first pilot control valve or a first auxiliary cylinder.

First actuating device 50 furthermore comprises a first supply connection 100. First supply connection 100 is an inlet and outlet for the fluid. Pump 40 is connected by a first supply line 102 to first actuating device 50. Pump 40 is therefore in flow-connection to first actuating device 50. A pressure relief valve 104 which opens can be arranged in first supply line 102, as shown in FIG. 2, should a pressure arise in first supply line 102 which pressure exceeds a predefined maximum pressure. A check valve 106 can likewise be arranged in first supply line 102 between first supply connection 100 and pressure relief valve 104. In order to reduce the pressure in first supply line 102, a throttle 108, such as a throttle valve, can be arranged between pump 40 and pressure relief valve 104.

Figure 3:
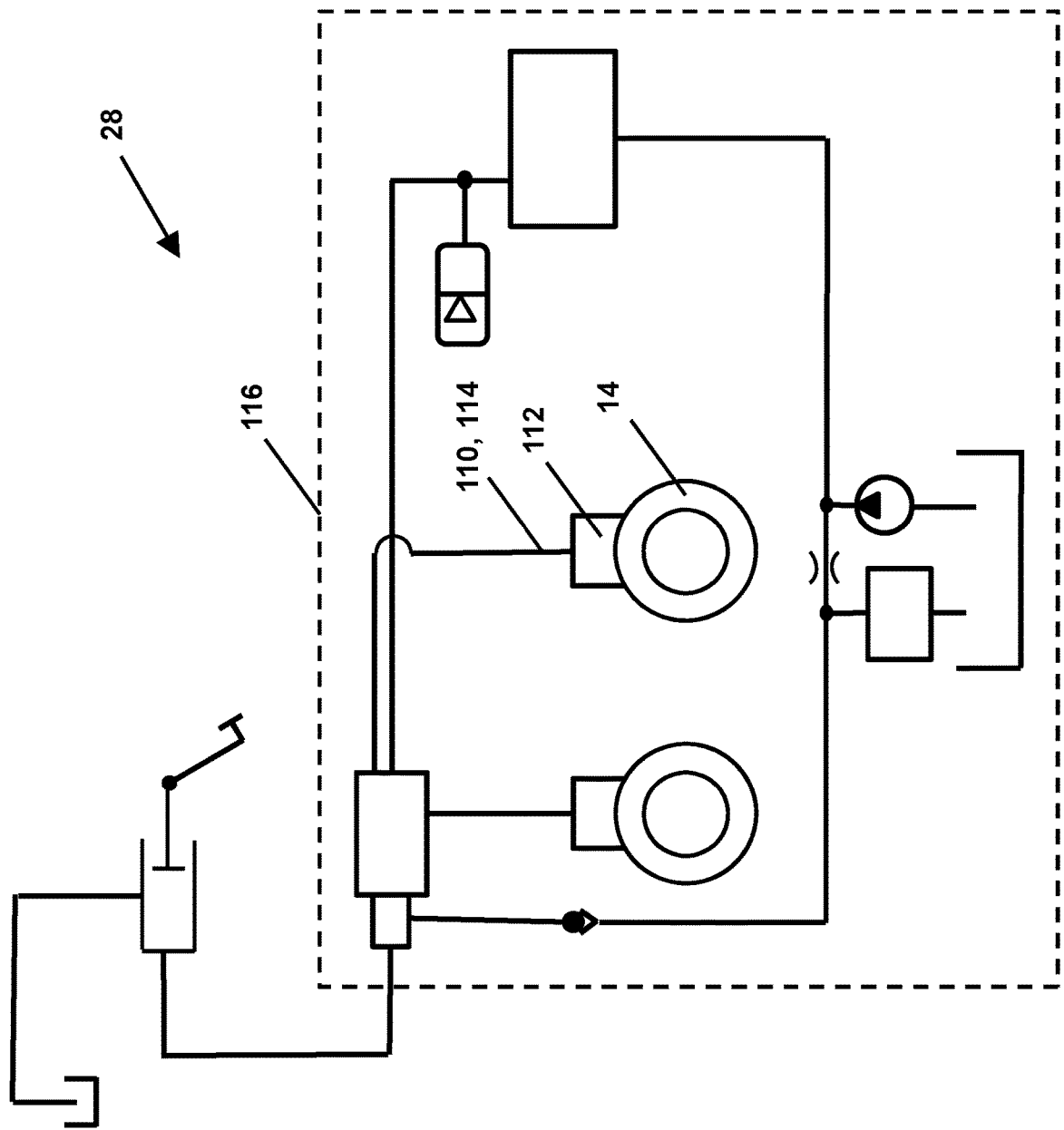
FIG. 3 shows a schematic representation of a second embodiment of the vehicle brake system.

FIG. 3 shows a schematic representation of a second embodiment of vehicle brake system 28 according to the present disclosure. The vehicle brake system shown in FIG.

3 corresponds substantially to the vehicle brake system shown in FIGS. 1 and 2 so that only details or differences are discussed below.

Vehicle brake system 28 comprises a second brake circuit 110. Second brake circuit 110 is provided between pump 40 and a second wheel cylinder 112. Pump 40 can be operated in second brake circuit 110 in order to generate pressure and move the fluid within second brake circuit 110.

In FIG. 3, second brake circuit 110 is coupled to a single or several front wheels 14 by second wheel cylinder 112. Second brake circuit 110 can, however, also only be coupled to a single or several rear wheels 16, according to some embodiments. In particular, first brake circuit 30 can be coupled to rear wheels 16 and second brake circuit 110 can be coupled to front wheels 14. First brake circuit 30 can likewise, however, also be coupled to a rear or front wheel 14, 16 and second brake circuit 110 can be coupled to a different rear or front wheel 14, 16. A further second brake line 114 of second brake circuit 110 connects first valve device 60 to second wheel cylinder 112. First or second brake circuit 30, 110 can be provided physically in a hydraulic assembly 116.

First valve device 60 is provided in first and second brake circuit 30, 110. First valve device 60 is movable between a first configuration, in which a flow connection between pump 40 and first and second wheel cylinder 32, 112 is produced by first valve device 60, and a second configuration, in which a flow connection between pump 40 and first and second wheel cylinder 32, 112 is prevented by first valve device 60.

First valve device 60, in particular if first actuating device 50 is actuated with first main cylinder 34, can be operated with first actuating device 50 or operated in such a manner that first valve device 60 can be moved or is moved into the first configuration. Second brake circuit 110 is configured, as a reaction to an actuation of brake pedal 54, to brake a front or rear wheel 14,16. As a reaction to an actuation of brake pedal 54, second wheel cylinder 112 can therefore brake front or rear wheel 14, 16.

Figure 4:
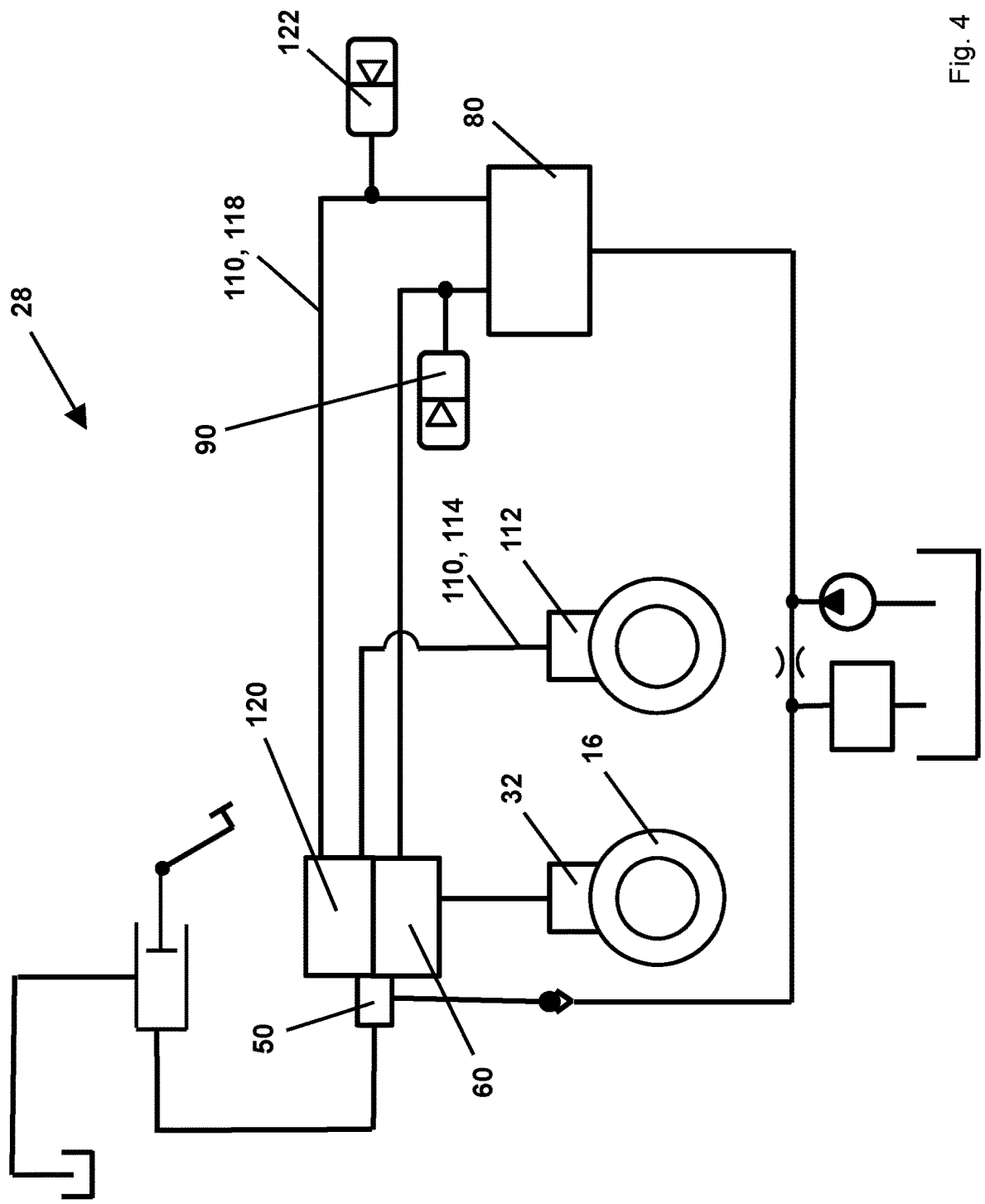
FIG. 4 shows a schematic representation of a third embodiment of the vehicle brake system.

FIG. 4 shows a schematic representation of a third embodiment of vehicle brake system 28 according to the present disclosure. Vehicle brake system 28 shown in FIG. 4 corresponds substantially to vehicle brake system 28 shown in FIGS. 1 to 3 so that only details or differences are discussed below.

Vehicle brake system 28 comprises according to FIG. 4 a second valve device 120. Second valve device 120 can be arranged between pump 40 and second wheel cylinder 112 in particular as represented. Second valve device 120 is provided in second brake circuit 110. Second valve device 120 can be moved between a third configuration, in which a flow connection between pump 40 and second wheel cylinder 112 is produced by second valve device 120, and a fourth configuration in which a flow connection between pump 40 and second wheel cylinder 112 is prevented by second valve device 120. First and second valve device 60, 120, in particular if first actuating device 50 is actuated with first main cylinder 34, can be operated with first actuating device 50 or operated in such a manner that first valve device 60 can be moved or is moved into the first configuration and second valve device 120 can be moved or is moved into the third configuration, in particular can be moved or is moved from the fourth configuration into the third configuration.

For example, first actuating device 50 can be formed to exert a shifting force S on first and second valve device 60, 120. First actuating device 50 and first and second valve device 60, 120 can be configured in such a manner and operated that, in particular if first actuating device 50 is actuated with first main cylinder 34, first actuating device 50 actuates first and second valve device 60, 120 with shifting force S so that first valve device 60 can be moved or is moved into the first configuration and second valve device 120 can be moved or is moved into the third configuration.

First actuating device 50 can, however, also actuate first and second valve device 60, 120 with pressure. If first actuating connection 52 is acted upon with pressure by first main cylinder 34, first actuating device 50 moves first valve device 60 into the first configuration and second valve device 120 into the third configuration. In particular, the first auxiliary cylinder, if first actuating connection 52 is acted upon with pressure by first main cylinder 34, moves first valve device 60 into the first configuration and second valve device 120 into the third configuration.

Moreover, a second brake line 118 of second brake circuit 110 connects accumulator charging device 80 to second valve device 120. A further second brake line 118 of second brake circuit 110 connects second valve device 120 to second wheel cylinder 112. A second accumulator 122 is arranged between accumulator charging device 80 and second valve device 120 at or in second brake line 118. Second accumulator 122 is in flow-connection or flow-connected by the second brake line to second valve device 120 and accumulator charging device 80 or arranged downstream of the accumulator charging device in the direction of flow.

Figure 5:
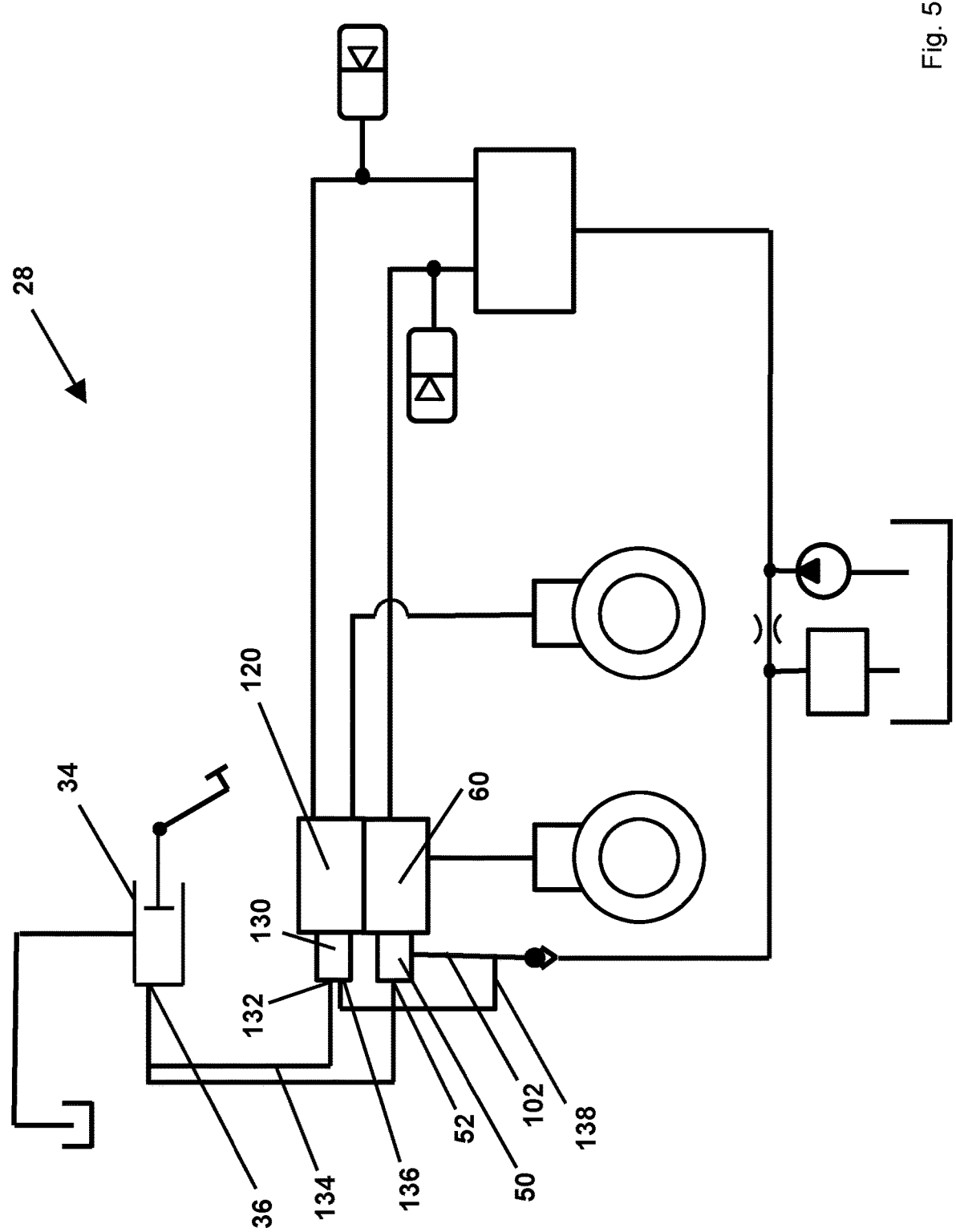
FIG. 5 shows a schematic representation of a fourth embodiment of the vehicle brake system.

FIG. 5 shows a schematic representation of a fourth embodiment of vehicle brake system 28 according to the present disclosure. Vehicle brake system 28 shown in FIG. 5 corresponds substantially to vehicle brake system 28 shown in FIGS. 1 to 4 so that only details or differences are discussed below.

As represented in FIG. 5, vehicle brake system 28 comprises a second actuating device 130 with a second actuating connection 132. In this case, first main cylinder connection 36 is in flow-connection to second actuating connection 132. Moreover, second actuating device 130 can be operated with first main cylinder 34 or is operated therewith.

Moreover, if first and second actuating device 50, 130 are actuated with first main cylinder 34, first valve device 60 can be operated or operated in such a manner with first actuating device 50 and second valve device 120 can be operated or operated in such a manner with second actuating device 130 that first valve device 60 can be moved or is moved into the first configuration and second valve device 120 can be moved or is moved into the third configuration.

First main cylinder connection 36 and second actuating connection 132 are in each case an inlet and outlet for the flowing fluid, i.e., hydraulic fluid. Vehicle brake system 28 comprises a second actuating line 134. First main cylinder connection 36 is therefore connected to second actuating connection 132 by second actuating line 134. First main cylinder 34 is therefore in flow-connection to second actuating device 130 or first main cylinder 34 is flow-connected to second actuating device 130. In the present embodiment, first main cylinder connection 36 is connected to first and second actuating connection 52, 132. For example, second actuating device 130 can be formed to exert a shifting force S on second valve device 120. Second actuating device 130 can comprise, for example, a second pressure valve or a piston with a second actuating connection, or be formed as the described pilot control valve or second auxiliary cylinder.

Second actuating device 130 furthermore comprises a second supply connection 136. Second supply connection 136 is an inlet and outlet for the fluid. Pump 40 is connected by a second supply line 138 to second actuating device 120. Pump 40 is therefore in flow-connection to second actuating device 120. First and second supply line 102, 138 run partially as a joint line, wherein pressure relief valve 104, check valve 106 and throttle 108 are arranged in the joint line. First and second supply line 102, 138 can, however, also be embodied as fully separated lines. A further pressure relief valve 104 can then be arranged in second supply line 138, which pressure relief valve 104 opens, should a pressure which exceeds a predefined maximum pressure arise in second supply line 138. A further check valve can likewise be arranged in second supply line 102 between second supply connection 136 and the further pressure relief valve. In order to reduce or restrict the pressure in second supply line 138, a further throttle valve can be arranged between pump 40 and the further pressure relief valve.

Figure 6:
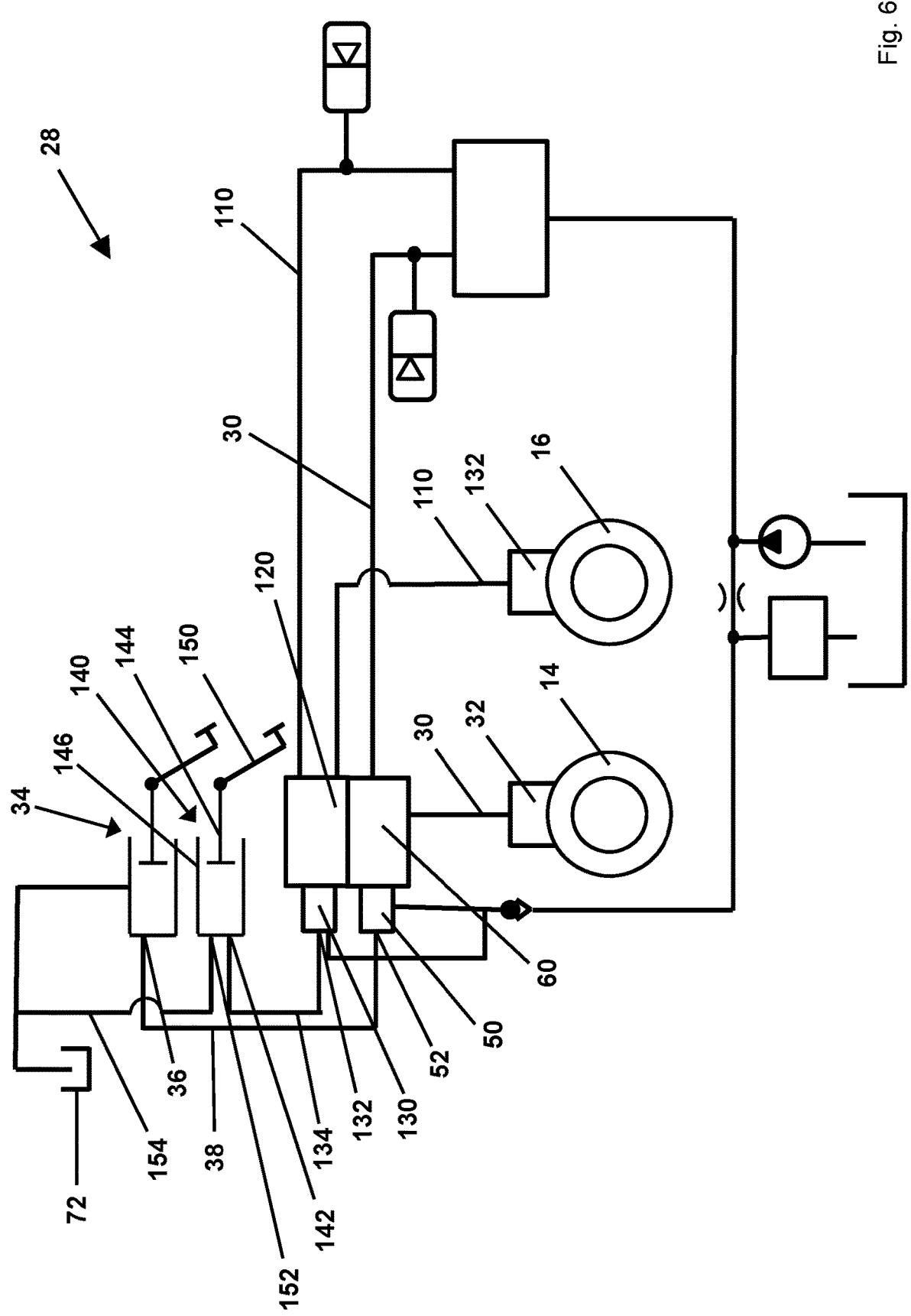
FIG. 6 shows a schematic representation of a fifth embodiment of the vehicle brake system.

FIG. 6 shows a schematic representation of a fifth embodiment of vehicle brake system 28 according to the present disclosure. Vehicle brake system 28 shown in FIG. 6 corresponds substantially to vehicle brake system 28 shown in FIGS. 1 to 5 so that only details or differences are discussed below.

As shown in FIG. 6, vehicle brake system 28 comprises a second main cylinder 140 with a second main cylinder connection 142. Second main cylinder connection 142 and second actuating connection 132 is in each case an inlet and outlet for the fluid. First main cylinder connection 36 is thus connected by first actuating line 38 to first actuating connection 52 and second main cylinder connection 142 is connected by second actuating line 134 to second actuating connection 132. Second main cylinder 140 is therefore in flow-connection to second actuating device 130 or second main cylinder 140 is flow-connected to second actuating device 130. Moreover, second actuating device 130 can be operated with second main cylinder 140. Moreover, second valve device 120, in particular if second actuating device 130 is actuated with second main cylinder 140, can be operated with second actuating device 130 or can be operated in such a manner that second valve device 120 can be moved or is moved into the third configuration.

Second main cylinder 140 comprises a second main cylinder chamber 146 and a second main cylinder piston 144 arranged in second main cylinder chamber 146. In this case, second main cylinder connection 142 can be an inlet or outlet of second main cylinder chamber 146. Second main cylinder piston 144 can be moved in the second main cylinder chamber 146 by being acted upon with pressure into a retracted and extended position in relation to second main cylinder chamber 146. Second main cylinder 140, in particular second main cylinder piston 144, can be actuated with a further brake pedal 150 by a user. Second main cylinder 140 comprises a second reservoir connection 152. Second reservoir connection 152 is inlet and outlet for the fluid. Second reservoir connection 152 is connected with a second reservoir line 154 to reservoir 72. Second main cylinder 140 is therefore in flow connection to reservoir 72.

Thus, the first valve device, in particular if first actuating device 130 is actuated with first main cylinder 140, can be operated with first actuating device 130 such that first valve device 120 can be moved into the first configuration, or second valve device 120, in particular if second actuating device 130 is actuated with second main cylinder 140, can be operated with second actuating device 130 such that second valve device 120 can be moved into the third configuration. Vehicle brake system 28 is therefore configured as a reaction to an actuation of brake pedal 54 or further brake pedal 150 to brake front or rear wheels 14, 16 assigned to respective first and second wheel cylinders 32, 112 independently of one another. In this case, brake pedal 54 and further brake pedal 150 can be actuated independently of one another, but jointly or in each case individually.

Figure 7:
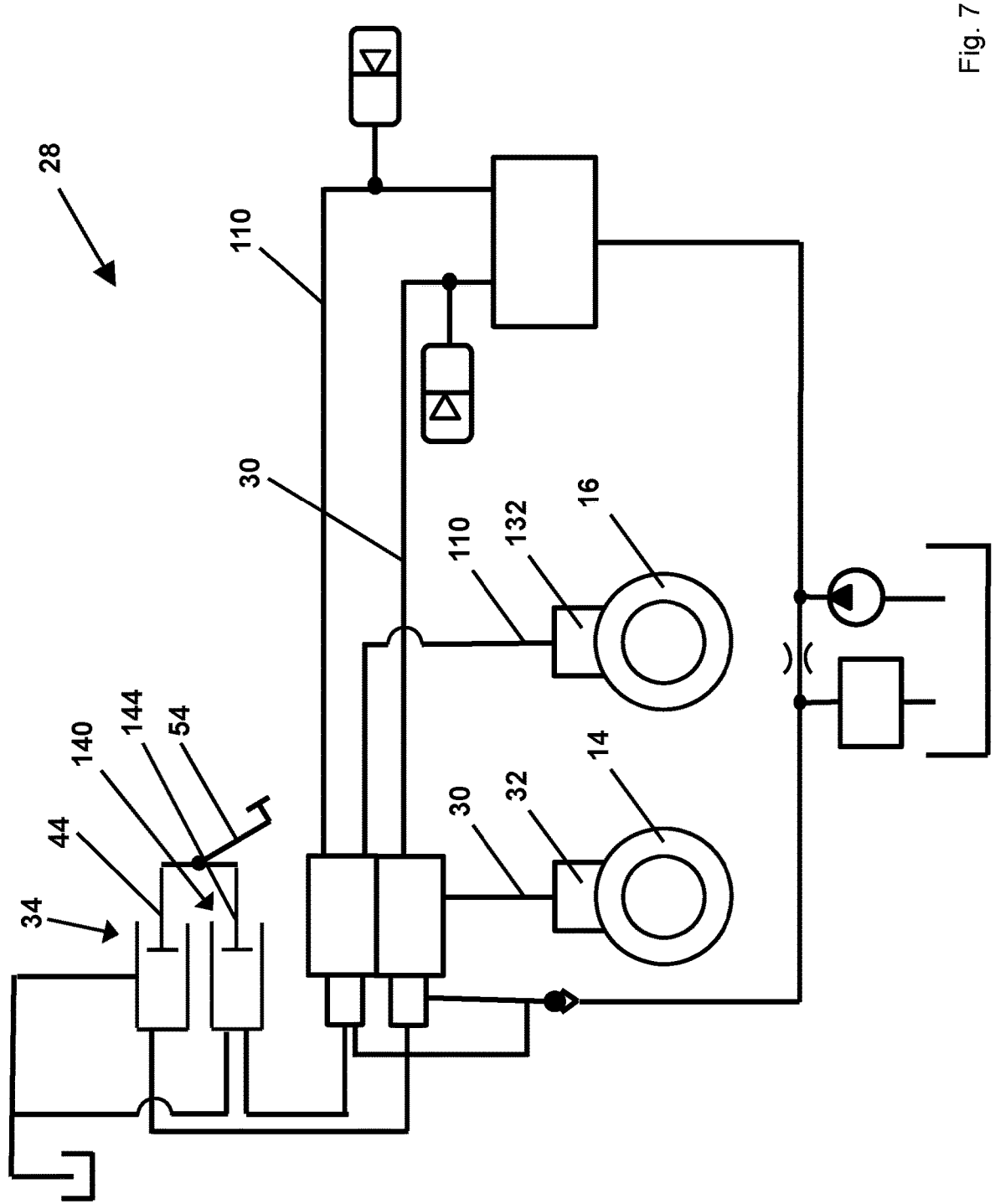
FIG. 7 shows a schematic representation of a sixth embodiment of the vehicle brake system.

FIG. 7 shows a schematic representation of a sixth embodiment of vehicle brake system 28 according to the present disclosure. Vehicle brake system 28 shown in FIG. 7 corresponds substantially to vehicle brake system 28 shown in FIGS. 1 to 6 so that only details or differences are discussed below.

First and second main cylinder 34, 140, in particular first and second main cylinder piston 44, 144, can in this embodiment only be actuated jointly with brake pedal 54. Vehicle brake system 28 is therefore configured as a reaction to an actuation of brake pedal 54 to simultaneously brake front or rear wheels 14, 16 assigned to respective first and second wheel cylinder 32, 112. First and second brake circuit 30, 110, or first and second wheel cylinder 32, 112, can therefore, as a reaction to an actuation of brake pedal 54, jointly brake front or rear wheels 14, 16 assigned to first and second wheel cylinder 32, 112.

Each agricultural tractor 10 according to the present disclosure, in particular according to FIG. 1, can comprise all the embodiments of a vehicle brake system 28 according to FIGS. 1 to 7. First or second main cylinder 34, 140 and reservoir 72 are arranged in cabin 20 and all other components of vehicle brake system 28 are arranged in all other parts of the tractor, in particular on or in the chassis.

FIG. 8 shows a schematic representation of an arrangement of a vehicle brake system 28 in a tractor 10 according to the present disclosure. Vehicle brake system 28 shown in FIG. 8 corresponds substantially to vehicle brake system 28 shown in FIGS. 1 to 7 and tractor 10 so that only details or differences are discussed below. Only the first or second main cylinder and the reservoir as well as in particular the associated lines are arranged in cabin 20, according to some embodiments. All of the other components of the vehicle brake system are arranged on, in particular in, the chassis, according to some embodiments.

FIG. 9 shows a schematic representation of the first and second actuating device with respectively assigned valve device 60. The details shown in FIG. 9 of vehicle brake system 28 correspond substantially to vehicle brake system 28 shown in FIGS. 1 to 8 or tractor 10 so that only details or differences are discussed in detail below.

First or second valve device 60, 120 can have in each case a first restoring element 180 for restoring into the second or fourth configuration. Moreover, first or second valve device 60, 120 can have in each case a second restoring element 182 for restoring into the second or fourth configuration. As a result of this, in the event of gentle actuation of brake pedal 54 or further brake pedal 150, the fluid flow is advantageously interrupted, wherein each further movement builds up pressure and first or second valve device 60, 120 are actuated.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A vehicle brake system, comprising:
a hydraulic fluid pump;
a first main cylinder with a first main cylinder connection;
a first actuating device with a first actuating connection and with a first supply connection, the first main cylinder connection being in hydraulic fluid flow-connection to the first actuating connection and the hydraulic fluid pump being in hydraulic fluid flow connection with the first supply connection through a first supply line, and the first actuating device being operable with the first main cylinder;
a pressure relief valve arranged in the first supply line;
a check valve arranged in the first supply line between the first actuating device and the pressure relief valve;
a throttle valve arranged between the hydraulic fluid pump and the pressure relief valve;
a first brake circuit provided between the hydraulic fluid pump and a first wheel cylinder, the first brake circuit including an accumulator in flow connection with a brake line coupled to the hydraulic fluid pump, the hydraulic fluid pump in the first brake circuit being operable to generate pressure and move a hydraulic fluid within the first brake circuit through the brake line; and
a first valve device coupled to the hydraulic fluid pump through the brake line, the first valve device including a through-flow position and a locking position, the first valve device provided in the first brake circuit, the first valve device being movable between a first configuration in which a first flow connection is produced at the through-flow position between the hydraulic fluid pump and the first wheel cylinder, and a second configuration at the locking position in which the first flow connection between the hydraulic fluid pump and the first wheel cylinder is prevented;
wherein, the first valve device is operable with actuation of the first actuating device;
wherein, the first valve device is movable into the first configuration.

2. The vehicle brake system as claimed in claim 1, further comprising a second brake circuit provided between the hydraulic fluid pump and a second wheel cylinder, the hydraulic fluid pump being operable in the second brake circuit to generate pressure and move the hydraulic fluid within the second brake circuit.

3. The vehicle brake system as claimed in claim 2, wherein the first valve device is provided in the first and second brake circuit, the first valve device being movable between the first configuration in which a second flow connection is produced between the hydraulic fluid pump and the first and second wheel cylinder, and the second configuration in which the second flow connection between the hydraulic fluid pump and the first and second wheel cylinder is prevented.

4. The vehicle brake system as claimed in claim 3, wherein the first valve device is operable with the first actuating device, the first valve device being movable into the first configuration.

5. The vehicle brake system as claimed in claim 2, further comprising a second valve device provided in the second brake circuit and being movable between a third configuration in which a third flow connection between the hydraulic fluid pump and the second wheel cylinder is produced, and a fourth configuration in which the third flow connection between the hydraulic fluid pump and the second wheel cylinder is prevented.

6. The vehicle brake system as claimed in claim 5, wherein the first and second valve device are operated with the first actuating device, the first valve device being movable into the first configuration and the second valve device being movable into the third configuration.

7. The vehicle brake system as claimed in claim 5, further comprising:
a second actuating device having a second actuating connection;
wherein, the first main cylinder connection is in flow-connection to the second actuating connection, and the second actuating device is operable with the first main cylinder; and
wherein, the first valve device is operable with the first actuating device and the second valve device is operable with the second actuating device, the first valve device being movable into the first configuration and the second valve device being movable into the third configuration.

8. The vehicle brake system as claimed in claim 5, further comprising:
a second main cylinder having a second main cylinder connection and a second actuating device with a second actuating connection;
wherein, the second main cylinder connection is in flow connection to the second actuating connection, and the second actuating device is operable with the second main cylinder;
wherein, the first valve device is operable with the first actuating device, the first valve device being movable into the first configuration or the second valve device being operable with the second actuating device; and
wherein, the second valve device is movable into the third configuration.

9. The vehicle brake system as claimed in claim 7, wherein the first actuating device comprises a first supply connection or the second actuating device comprises a second supply connection.

10. The vehicle brake system as claimed in claim 9, wherein the first or second supply connection is flow-connected by a first supply line to the hydraulic fluid pump.

11. The vehicle brake system as claimed in claim 8, wherein the first main cylinder comprises a first reservoir connection or the second main cylinder comprises a second reservoir connection, wherein the first main cylinder is fluidly connected to a reservoir by the first reservoir connection and the second main cylinder is fluidly connected to the reservoir by the second reservoir connection.

12. The vehicle brake system as claimed in claim 11, wherein the first main cylinder is flow-connected by the first reservoir connection or the second main cylinder is flow-connected by the second reservoir connection to a reservoir.

13. The vehicle brake system as claimed in claim 5, wherein the first or second valve device comprise a first restoring element for restoring into the second or fourth configuration.

14. The vehicle brake system as claimed in claim 13, wherein the first or second valve device comprise a second restoring element for restoring into the second or fourth configuration.

15. An agricultural tractor, comprising:
a plurality of ground-engaging devices;
a chassis supported by the plurality of ground-engaging devices;
a cabin coupled to the chassis;
a drive for providing power to the plurality of ground-engaging devices; and a vehicle brake system comprising:
- a hydraulic fluid pump;
- a first main cylinder with a first main cylinder connection;
- a first actuating device with a first actuating connection and with a first supply connection, the first main cylinder connection being in hydraulic fluid flow-connection to the first actuating connection and the hydraulic fluid pump being in hydraulic fluid flow connection with the first supply connection through a first supply line, and the first actuating device being operable with the first main cylinder;
- a pressure relief valve arranged in the first supply line;
- a check valve arranged in the first supply line between the first actuating device and the pressure relief valve;
- a throttle valve arranged between the hydraulic fluid pump and the pressure relief valve;
- a first brake circuit provided between the hydraulic fluid pump and a first wheel cylinder, the first brake circuit including an accumulator in flow connection with a brake line coupled to the hydraulic fluid pump, the hydraulic fluid pump in the first brake circuit being operable to generate pressure and move a hydraulic fluid within the first brake circuit through the brake line; and
- a first valve device coupled to the hydraulic fluid pump through the brake line, the first valve device including a through-flow position and a locking position, the first valve device provided in the first brake circuit, the first valve device being movable between a first configuration at the through-flow position in which a first flow connection is produced between the hydraulic fluid pump and the first wheel cylinder, and a second configuration at the locking position in which the first flow connection between the hydraulic fluid pump and the first wheel cylinder is prevented;
- wherein, the first valve device is operable with actuation of the first actuating device; and
- wherein, the first valve device is movable into the first configuration.

16. The agricultural tractor as claimed in claim 15, wherein the first or a second main cylinder and a reservoir are arranged in the cabin.

17. The agricultural tractor as claimed in claim 15, wherein the vehicle braking system comprises a second brake circuit provided between the hydraulic fluid pump and a second wheel cylinder, the hydraulic fluid pump being operable in the second brake circuit to generate pressure and move the hydraulic fluid within the second brake circuit.

18. The agricultural tractor as claimed in claim 17, wherein the vehicle braking system comprises a second valve device provided in the second brake circuit and being movable between a third configuration in which a third flow connection between the hydraulic fluid pump and the second wheel cylinder is produced, and a fourth configuration in which a fourth flow connection between the hydraulic fluid pump and the second wheel cylinder is prevented.

19. The agricultural tractor as claimed in claim 15, wherein the first actuating device comprises a first supply connection or a second actuating device comprises a second supply connection.

20. A vehicle brake system, comprising:
- a hydraulic fluid pump;
- a first main cylinder with a first main cylinder connection;
- a first actuating device with a first actuating connection and with a first supply connection, the first main cylinder connection being in hydraulic fluid flow-connection to the first actuating connection and the hydraulic fluid pump being in hydraulic fluid flow connection with the first supply connection through a first supply line, and the first actuating device being operable with the first main cylinder;
- a pressure relief valve arranged in the first supply line;
- a check valve arranged in the first supply line between the first actuating device and the pressure relief valve;
- a throttle valve arranged between the hydraulic fluid pump and the pressure relief valve;
- a first brake circuit provided between the hydraulic fluid pump and a first wheel cylinder, the first brake circuit including a first accumulator in flow connection with a brake line coupled to the hydraulic fluid pump, the hydraulic fluid pump in the first brake circuit being operable to generate pressure and move a hydraulic fluid within the first brake circuit through the brake line;
- a first valve device coupled to the hydraulic fluid pump through the brake line, the first valve device including a through-flow position and a locking position, the first valve device provided in the first brake circuit, the first valve device being movable between a first configuration at the through-flow position in which a first flow connection is produced between the hydraulic fluid pump and the first wheel cylinder, and a second configuration at the locking position in which the first flow connection hydraulic fluid between the hydraulic fluid pump and the first wheel cylinder is prevented;
- a second brake circuit provided between the hydraulic fluid pump and a second wheel cylinder, the first brake circuit including a second accumulator in flow connection with a brake line coupled to the hydraulic fluid pump, the hydraulic fluid pump being operable in the second brake circuit to generate pressure and move the hydraulic fluid within the second brake circuit through the brake line; and
- a second valve device coupled to the hydraulic fluid pump through the brake line, the second valve device provided in the second brake circuit and being movable between a third configuration in which a third flow connection between the hydraulic fluid pump and the second wheel cylinder is produced, and a fourth configuration in which the third flow connection between the hydraulic fluid pump and the second wheel cylinder is prevented;
- wherein, the first valve device is operable with actuation of the first actuating device; and
- wherein, the first valve device is movable into the first configuration.

* * * * *